United States Patent
Hill et al.

(10) Patent No.: US 10,019,461 B2
(45) Date of Patent: Jul. 10, 2018

(54) TRANSPARENT AND NEAR-REAL TIME CODE DEPLOYS

(71) Applicant: CA, Inc., New York, NY (US)

(72) Inventors: Joshua A. Hill, Austin, TX (US); Colby M. White, Austin, TX (US)

(73) Assignee: CA, Inc., New York, NY (US)

( * ) Notice: Subject to any disclaimer, the term of this patent is extended or adjusted under 35 U.S.C. 154(b) by 305 days.

(21) Appl. No.: 14/670,102

(22) Filed: Mar. 26, 2015

(65) Prior Publication Data
US 2016/0283214 A1   Sep. 29, 2016

(51) Int. Cl.
G06F 9/445   (2018.01)
G06F 17/30   (2006.01)
G06F 8/71    (2018.01)

(52) U.S. Cl.
CPC .......... *G06F 17/3023* (2013.01); *G06F 8/71* (2013.01)

(58) Field of Classification Search
CPC ....................................... G06F 9/445
USPC ............................... 717/174–178
See application file for complete search history.

(56) References Cited

U.S. PATENT DOCUMENTS

| | | | | |
|---|---|---|---|---|
| 5,745,669 A * | 4/1998 | Hugard | ............... | G06F 11/1417 714/3 |
| 6,473,767 B1 * | 10/2002 | Bailey | ............... | G06F 17/30067 |
| 9,292,529 B2 * | 3/2016 | Subramanya | | |
| 2003/0163799 A1 * | 8/2003 | Vasilik | ............... | G06F 8/71 717/100 |
| 2006/0095470 A1 * | 5/2006 | Cochran | ........... | G06F 17/30067 |
| 2008/0022205 A1 * | 1/2008 | Shinkai | ............... | G11B 27/034 715/723 |
| 2014/0013331 A1 * | 1/2014 | Noro | ........... | G06F 9/50 718/103 |
| 2015/0067759 A1 * | 3/2015 | Beard | ............... | H04L 63/20 726/1 |
| 2015/0261766 A1 * | 9/2015 | Apte | ........... | G06F 8/51 707/654 |
| 2016/0124739 A1 * | 5/2016 | Zongker | ............... | G06F 8/65 717/172 |
| 2016/0335278 A1 * | 11/2016 | Tabaaloute | ........ | G06F 17/30212 |

* cited by examiner

*Primary Examiner* — Jae Jeon
(74) *Attorney, Agent, or Firm* — Baker Botts L.L.P.

(57) ABSTRACT

A method includes monitoring a plurality of files in a source file system at pre-determined time intervals. The plurality of files in the source file system include a plurality of designated and undesignated files. The designated files are pre-selected for near-real time editing. Each of the plurality of files is stored at a respective source file path in the source file system. The method also includes detecting that one of the plurality of files in the source file system has been modified. The method further includes determining whether the modified file is a designated file. The method additionally includes, in response to determining that the modified file is a designated file, mapping the source file path of the modified file to a corresponding destination file path in a destination file system and copying the modified file from the source file path in the source file system to the destination file path in the destination file system.

20 Claims, 3 Drawing Sheets

TRANSPARENT AND NEAR-REAL TIME CODE DEPLOYS

BACKGROUND

The disclosure relates generally to the software development process, and more specifically to the ability to deploy code transparently and in near-real time.

SUMMARY

According to one embodiment of the disclosure, a method includes monitoring a plurality of files in a source file system at pre-determined time intervals. The plurality of files in the source file system include a plurality of designated and undesignated files. The designated files are pre-selected for near-real time editing. Each of the plurality of files is stored at a respective source file path in the source file system. The method also includes detecting that one of the plurality of files in the source file system has been modified. The method further includes determining whether the modified file is a designated file. The method additionally includes, in response to determining that the modified file is a designated file, mapping the source file path of the modified file to a corresponding destination file path in a destination file system and copying the modified file from the source file path in the source file system to the destination file path in the destination file system.

Other features and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the features and advantages thereof, reference now is made to the following description taken in connection with the accompanying drawings.

DETAILED DESCRIPTION

Figure 1:
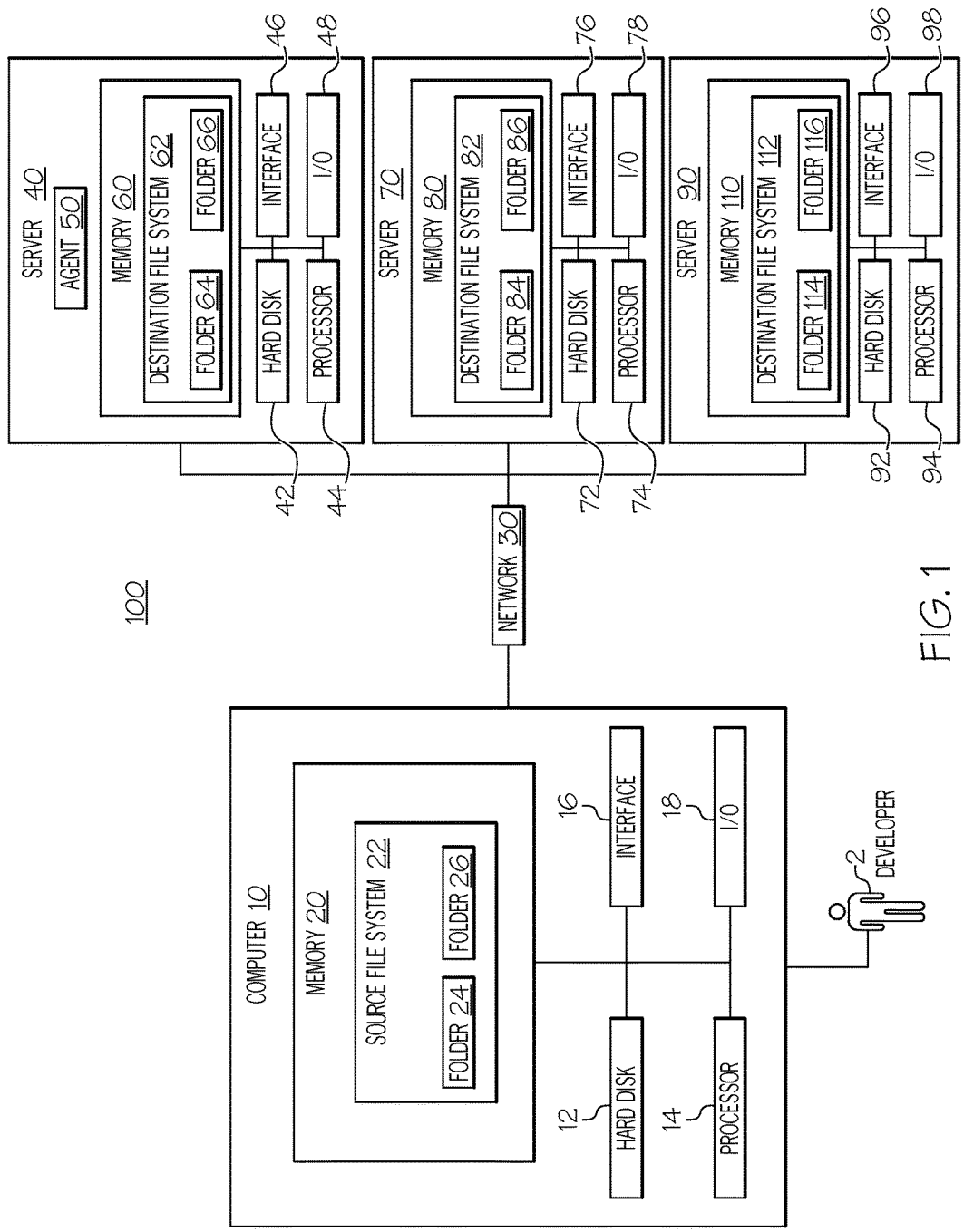
FIG. 1 illustrates a block diagram of a system for deploying code transparently and in near-real time in accordance with a non-limiting embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The software development process follows a lifecycle from identifying the need of the customer to maintaining a bug-free end product. Testing software during the implementation phase of that process is integral to efficiently developing a high-end work product. Testing ensures that defects are discovered as soon as possible and guides the developer into creating a more robust end product. Typically, the testing processing involves an iterative cycle of implementing a high-level design in source code, then testing that source code in a testing environment, and implementing any fixes. Testing environments can simulate an array of scenarios for the software, including real-world scenarios in accordance with how the software may be used in the future and scenarios that test the end limits that the software is capable of.

Many systems require code to be packaged and then for that package to be deployed to the end system for testing. The source code is typically built, then all of the built code is packaged. The package has a fixed directory structure and contains all of the built code, along with files representing metadata about the package. The directory structure may also be compressed or archived as part of this process. The package is then deployed to the end system for testing, where the package is unwrapped to be used on the end system during the test. After deployment, the source directory tree of the built code on the original system mirrors the destination directory tree on the end system after the deployment step is complete.

Ideally, any changes that a developer makes to the code in the source directory tree would appear instantly in the destination directory tree in the testing environment. But the package and deployment process can take a substantial amount of time and significantly slow down the iterative development cycle. Certain embodiments of the present disclosure provide tools for more transparently synchronizing code deploys in near-real time. The system may significantly speed up the testing during the implementation phase of the software development lifecycle.

In certain embodiments, an agent monitors the source directory tree for changes to the code and synchronizes those changes in near-real time to the corresponding location in the destination directory tree on the end testing system. The agent is configured with a list of source directories to monitor and a corresponding location on the end testing system for each directory. When the agent detects a change in one of the source directories it is configured to monitor, the agent synchronizes the changed code to destination directories on the end system. As such, the package and deploy process is avoided during the iterative implementation and testing cycle.

With reference to FIG. 1, a system 100 for deploying code transparently and in near-real time is illustrated in accordance with a non-limiting embodiment of the present disclosure. System 100 includes computer 10 and servers 40, 70, and 90, which are all connected via network 30. Developer 2 uses computer 10. Computer 10 includes memory 20, hard disk 12, processor 14, interface 16, and I/O 18. Processor 14 loads instructions from hard disk 12 and executes them in memory 20. Memory 20 includes source file system 22, which includes one or more folders. As an example, source file system 22 includes folders 24 and 26. Server 40 includes agent 50, memory 60, hard disk 42, processor 44, interface 46, and I/O 48. Processor 44 loads instructions from hard disk 42 and executes them in memory 60. For example, processor 44 executes an agent 50 in memory 60. Memory 60 includes destination file system 62, which includes folders. As an example, destination file system 62 includes folders 64 and 66. Server 70 includes memory 80, hard disk 72, processor 74, interface 76, and I/O 78. Processor 74 loads instructions from hard disk 72 and executes them in memory 80. Memory 80 includes destination file system 82, which includes folders. As an example, destination file system 82 includes folders 84 and 86. Server 90 includes memory 110, hard disk 92, processor 94, interface 96, and I/O 98. Processor 94 loads instructions from hard disk 92 and executes them in memory 110. Memory 110 includes destination file system 112, which includes folders. As an example, destination file system 112 includes folders 114 and 116.

For example, agent 50 runs on server 40. Agent 50 may be configured to monitor certain designated files in source file system 22. For example, agent 50 may monitor the designated files continuously or may poll source file system 22 at a specified time interval to check whether any designated file has been modified. For example, agent 50 may poll source file system 22 every 5 or 10 seconds to check whether the file has been modified. Any time interval may be used. Each designated file has been pre-selected to be edited in near-real time. As an example, the files in folder 24 in source file system 22 may be designated. There may also be undesignated files in source file system 22. Undesignated files are not pre-selected to be edited in near-real time. Agent 50 is configured to not synchronize the undesignated files. As an example, the files in folder 26 may be undesignated, and agent 50 will only synchronize the files contained in folder 24, ignoring any changes to the code in the files contained in folder 26. Because agent 50 does not synchronize any modifications that are made to undesignated files in source file system 22, if any modifications are made to the undesignated files, the traditional package and deploy process will need to be performed in order for those modified files to be tested in the end system. Thus, in certain embodiments, if agent 50 determines that a file that was modified is an undesignated file, then system 100 packages all of the designated and undesignated files in source file system 22 into a package file, and deploys that package file to the destination file system, for example destination file system 62. Any further iterative modifications to designated file would follow the above-described transparent and near-real time code synchronizing process.

Agent 50 may be configured to monitor certain designated files in source file system 22 at pre-determined time intervals. For example, agent 50 may monitor the designated files continuously or may poll source file system 22 at a specified time interval to check whether any designated file has been modified. For example, agent 50 may poll source file system 22 every 5 or 10 seconds to check whether the file has been modified. Any time interval may be used. Each designated file has been pre-selected to be edited in near-real time.

Agent 50 monitors the designated files in source file system 22 for any changes that developer 2 makes to the code in those designated files. For example, agent 50 monitors folder 24 for modifications to its files. Agent 50 detects that one of the files in folder 24 has been modified. Agent 50 determines whether the modified file in folder 24 is a designated file. In response to determining that the modified file in folder 24 is a designated file, agent 50 maps the file path of the modified file in folder 24 of source file system 22 to a destination file path in the destination file system. For example, if agent 50 is configured to synchronize designated files from computer 10 to server 40, then agent 50 may map the file path of folder 24 in source file system 22 on computer 10 to the file path of folder 64 in destination file system 62 on server 40. Agent 50 then copies the modified file from the source file path in folder 24 of source file system 22 on computer 10 to the designated file path of folder 64 in destination file system 62 on server 40. Agent 50 may copy the modified file from computer 10 to server 40 over network 30.

Agent 50 may be configured to synchronize code deploys from source file system 22 on computer 10 to one or more servers. Computer 10 and servers 40, 70, and 90 may communicate over network 30. As an example, agent 50 may synchronize modified files from computer 10 only to server 40. As another example, agent 50 may synchronize modified files from computer 10 to one or more of servers 40, 70, and 90. In this example, agent 50 may be configured to monitor multiple designated files in source file system 22. Agent 50 may detect that a first designated file has been modified, map the source file path of the first designated file to a destination file path in destination file system 62 on server 40, and copy the first designated file to the destination file path in destination file system 62 on server 40. Agent 50 may then detect that a second designated file has been modified, map the source file path of the second designated file to a destination file path in destination file system 82 on server 70, and copy the second designated file to the destination file path in destination file system 82 on server 70. As an even further example, agent 50 may detect a third designated file has been modified, map the source file path of the third designated file to a destination file path in destination file system 112 on server 90, and copy the third designated file to a destination file path in destination file system 112 on server 90.

In a preferred embodiment, agent 50 resides on one of servers 40, 70, or 90. For example, the source code on computer 10 is built. Agent 50 is configured to monitor certain designated files of the built code. The built code and agent 50 are packaged and deployed together to server 40. Once on server 40, the built code and agent 50 are unpackaged. Agent 50 resides on server 40 and, over network 30, monitors the designated files on computer 10 for modifications. If modifications are detected for designated files, agent 50 on server 40 copies the modified files from its file path on computer 10 to the destination file path on server 40 in near-real time. As other examples, agent 50 may reside on server 70 or 90.

In another embodiment, agent 50 resides on computer 10. For example, the source code on computer 10 is built. Agent 50 is configured to monitor certain designated files of the built code. The built code is packaged and deployed to server 40, but agent 50 continues to reside on computer 10. Agent 50 monitors the designated files on computer 10 for modifications. If modifications are detected for designated files, agent 50 copies the modified files over network 30 from its source file path on computer 10 to the destination file path on server 40 in near-real time.

Agent 50 must have access to the built code in source file system 22 on computer 10. As an example, agent 50 can reside on a development server running on the same computer 10 as the built source code. As another example, agent 50 can reside on a virtual machine on developer 2's computer 10 and access the built code from a shared directory. As a further example, agent 50 can reside on a remote computer, for example server 40, that has mounted the built code using a remote file system, for example destination file system 62. Agent 50 need not have access to the original source code on source file system 22 as long as agent 50 has access to the built code. For example, Java source files may be converted into Jar files or CoffeeScript files may be converted into JavaScript files. Agent 50 may be configured to monitor any of these files as long as agent 50 has access to the files on source file system 22.

Although certain embodiments of the present disclosure remove the necessity to package and deploy the built code with each iterative implementation and testing cycle, as described above, an initial package and deploy step may still be required for the requisite directory structure on destination file system 62 to be set up for the first time. In addition, the initial package and deploy step may provide the means for transporting agent 50 from computer 10 to remote servers 40, 70, or 90 over network 30. Once the initial package and deploy step occurs to set up the destination directory structure and/or install agent 50 on the destination server, for example server 40, certain embodiments of the present disclosure remove any further necessity for package and deploy steps during the implementation and testing iterative cycle.

Agent 50 may be configured to monitor certain designated files in various ways. For example, agent 50 may receive a list of file paths where the designated files are stored in source file system 22. Any file that is contained in one of the listed file paths is a designated file. Any file path that contains a file in source file system 22 and is not contained in the list holds an undesignated file, and agent 50 will thus not monitor that undesignated file for modifications. Agent 50 may also receive a list of file paths in the destination file system, for example destination file systems 62, 82, or 112, that agent 50 is configured to synchronize with source file system 22. Each of the source file paths may correspond to a destination file path on the list. Agent 50 may receive the source file paths in the same list as it receives the destination file paths, or they may be provided in two separate lists. The source file paths may be explicitly mapped to the destination file paths in the list received by agent 50. The one or more lists described above may be provided to agent 50 in one or more configuration file.

Agent 50 may be configured to monitor certain designated files by configuring agent 50 to search source file system 22 for marker files. Agent 50 may search source file system 22 continuously for marker files or search at pre-determined time intervals. A marker file may be placed in each folder that a modified file resides. If agent 50 finds a marker file, the modified file in the same file path as the marker file is a designated file that needs to be mapped to a destination file path and copied into that path. Accordingly, if agent 50 finds a marker file, agent 50 may create an auto-configuration rule that if the file contained at the file path of the marker file is modified in source file system 22, the modified file will be copied from the file path of the marker file to the corresponding destination file path in the destination file system. That rule may then be stored to the memory of the computer or server on which agent 50 resides, for example memory 60 if agent 50 resides on server 40. In this embodiment, if a modified file is detected by agent 50, mapping the source file path of the modified file to its destination file path may be performed by agent 50 reading the rule from memory 60 and executing the rule. As such, the modified file would be copied from the source file path on source file system 22 to its corresponding destination file path on destination file system 62.

In certain embodiments, the source file path and the destination file path that agent 50 is configured to monitor are absolute file paths. In other embodiments, the source file path and the destination file path that agent 50 is configured to monitor are relative file paths. A relative file path does not contain the full file path as an absolute file path would, but rather begins at a root directory. For example, the source file path that agent 50 is configured to monitor may be "/src/ui/*" so that agent 50 monitors any file in the "ui" folder of the source root directory of source file system 22. Agent 50 may be further configured to synchronize the modified files contained in the "/src/ui/" folder in source file system 22 to the "/www/" folder of destination file system 62. In this example, the file paths are relative, which allows agent 50 to synchronize without knowing the exact implementation of the directory on a particular server. This would allow code to be deployed to multiple server environments with different deployment paths without having to change the configuration of agent 50. For example, the "/www/" folder may be housed on the C:/ drive on server 40 but housed on the E:/ drive on server 70. With relative file paths, agent 50 can synchronize without knowing such implementation. In this example, agent 50 may create a rule as discussed above, which may map any file in "/src/ui/*" on source file system 22 to "/www/" on destination files system 62. Using relative file paths would further allow code to be deployed to one or more servers with dynamic file paths, which have randomly generated hash strings in the file paths.

Figure 2:
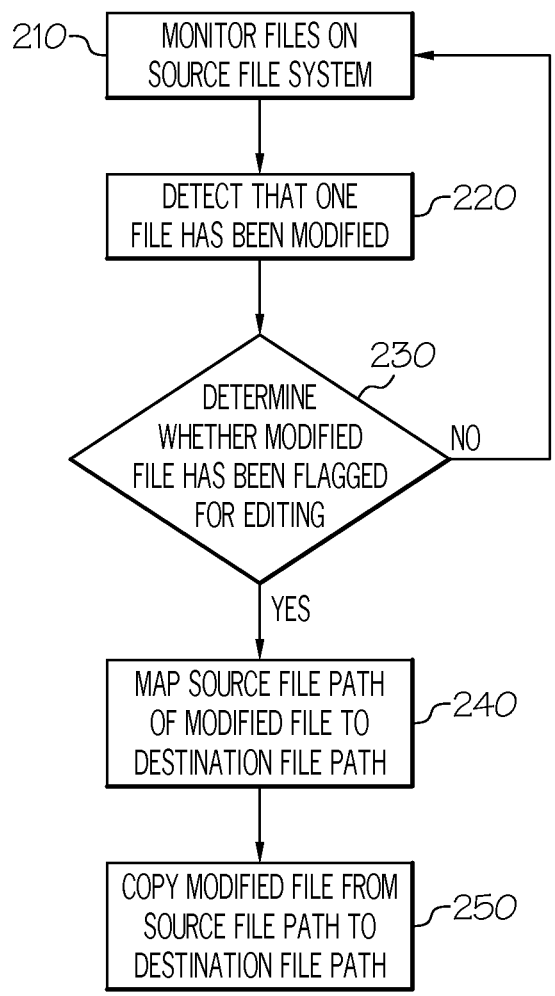
FIG. 2 illustrates a flow chart of a method deploying code transparently and in near-real time in accordance with a non-limiting embodiment of the present disclosure.

With reference to FIG. 2, a system for deploying code transparently and in near-real time is illustrated in accordance with a particular non-limiting embodiment of the present disclosure. At step 210, files on the source file system are monitored. For example, agent 50 polls the source file system 22 for modifications to its files every 5 to 10 seconds.

At step 220, a modification to one of the files is detected by the agent. For example, agent 50 finds a marker file indicating that a modified file is housed in the same directory as the marker file. As another example, agent 50 detects that the edit date or time of a file in source file system 22 has been updated, indicating that the file has been modified.

At step 230, agent 50 determines whether the modified file has been pre-selected for near-real time editing. For example, agent 50 may compare the file path of the modified file with a list of file paths agent 50 was configured to monitor to determine whether the file path is on the list and thus pre-selected for near-real time editing. As another example, agent 50 may determine that there is a marker file in the same root directory as the modified file, indicating that the modified file is marked or flagged as pre-selected for near-real time editing. In particular embodiments, if the modified file has not been pre-selected for editing, then agent 50 will ignore the modified file and go back to monitoring files on the source file system. In other embodiments, if the modified file has not been pre-selected for near-real time editing, then agent 50 will package all of the designated and undesignated files into a package file and deploy the package file to the testing environment. If the modified file has been pre-selected for editing, then the process continues to step 240.

In response to determining that the modified file is a designated file, the source file path of the modified file in the source file system is mapped to the destination file path in the destination file system at step 240. For example, folder 24 in source file system 22 on computer 10 is mapped to folder 64 in destination file system 62 on server 40.

Also in response to determining that the modified file is a designated file, the modified file is copied from the source file path to the mapped to the destination file path at step 250. For example, the modified file is copied from folder 24 in source file system 22 on computer 10 to folder 64 in destination file system 62 on server 40.

Figure 3:
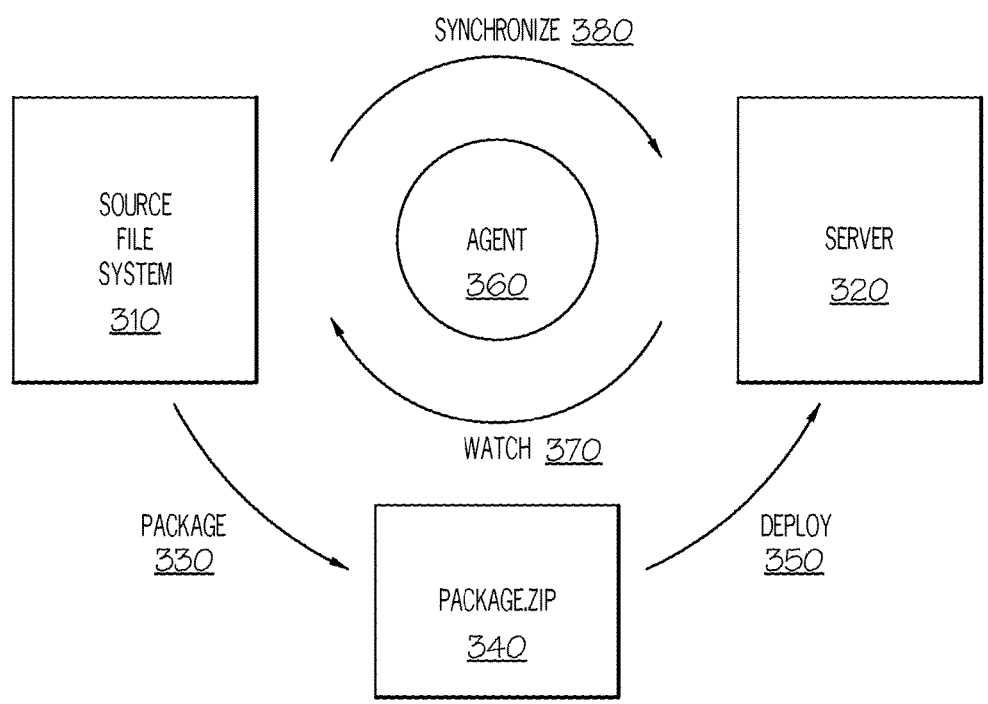
FIG. 3 illustrates an example of the traditional method of packaging and deploying code, in comparison to an example of the method for deploying code transparently and in near-real time in accordance with a non-limiting embodiment of the present disclosure.

With reference to FIG. 3 as an example, the traditional method of packaging and deploying code is illustrated, in comparison to an example of the method for deploying code transparently and in near-real time, which is also illustrated in accordance with a non-limiting embodiment of the present disclosure. Specifically, FIG. 3 shows a source file system 310 and a server 320. The traditional package and deploy process is illustrated by packaging the built code files according to step 330 from the source file system 310 into a package file, for example "package.zip" 340. Package.zip 340 is then deployed according to step 350 to server 320. The process of deploying code transparently and in near-real time according to certain embodiments of the present disclosure is illustrated by installing agent 360 onto server 320 during the initial package and deploy process, then having agent 360 iteratively watch for modifications to files in source file system 310 during step 370. During step 380, agent 50 synchronizes any modifications to designated files from source file system 310 that are found during step 370 with the destination file system on server 320.

Further, as referenced in FIG. 3 and described above, the traditional packaging and deploying process may accompany the synchronizing process of the present disclosure. For example, as described, agent 360 may be installed on server 320 during the initial package and deploy process As another example, agent 360 may be used to synchronize only designated files from source file system 310 to server 320 iteratively and in near-real time. But if agent 360 determines that an undesignated file on source file system 310 has been modified, system 100 may then perform a full package and deploy process into the test environment so that the code can be tested.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
    monitoring, using a processor, a plurality of files in a source the system at predetermined time intervals,
        wherein the plurality of files in the source file system comprises a plurality of designated and undesignated files, the designated files being pre-selected for near-real time editing, and
        wherein each of the plurality of files is stored at a respective source file path in the source file system;
    searching the source file system for a marker file, the marker file identifying the source file path of a first file of the plurality of files to be monitored;
    detecting the marker file in the source file system;
    in response to detecting the marker file, creating a rule that if the first the is modified in the source file system, the first file will be copied from the source file path to a corresponding destination file path in the destination file system;
    detecting that one of the plurality of files in the source file system has been modified;
    determining whether the modified file is a designated file; and
    in response to determining that the modified file is a designated file:
        mapping the source file path of the modified file to the corresponding destination file path in a destination the system; and
        copying the modified file from the source file path in the source file system to the destination file system, using the destination file path.

2. The method of claim 1, further comprising, in response to determining that a second modified file is an undesignated file:
    packaging a second plurality of designated and undesignated files into a package file; and
    deploying the package file to the destination file system.

3. The method of claim 1, wherein monitoring the plurality of files in the source file system further comprises:
    receiving a list comprising:
        the plurality of source file paths where each respective designated file of the plurality of designated and undesignated files is stored in the source file system; and
        a plurality of destination file paths in the destination file system, each destination file path corresponding to a respective source file path;
    monitoring the plurality of source file paths contained in the list at pre-determined time intervals; and
    if a file path in the source file system is not contained in the list, not monitoring the file path.

4. The method of claim 1, further comprising:
    storing the rule to a memory; and,
wherein mapping the source file path of the modified file to the corresponding destination file path further comprises:
    reading the rule from the memory; and
    executing the rule.

5. The method of claim 4, wherein both the source file path and the destination file path are relative file paths.

6. The method of claim 1, wherein a configuration file specifies whether the modified file is a designated file.

7. The method of claim 1, further comprising:
    detecting that a second file of the plurality of files in the source file system has been modified;
    determining whether the second modified file is a designated file; and
    in response to determining that the second modified file is a designated file:
        mapping the source file path of the second modified file to a corresponding destination file path in a second destination file system; and
        copying the second modified file from the source file path in the source file system to the destination file path in the second destination file system.

8. A computer configured to access a storage device, the computer comprising:
    a processor; and
    a non-transitory, computer-readable storage medium storing computer-readable instructions that when executed by the processor cause the computer to perform:
        monitoring a plurality of files in a source file system at pre-determined time intervals,
            wherein the plurality of files in the source file system comprises a plurality of designated and undesignated files, the designated files being pre-selected for near-real time editing, and
            wherein each of the plurality of files is stored at a respective source file path in the source file system;
        searching the source file system for a marker file, the marker file identifying the source file path of a first file of the plurality of files to be monitored;
        detecting the marker file in the source file system;
        in response to detecting the marker file, creating a rule that if the first file is modified in the source file system, the first file will be copied from the source file path to a corresponding destination file path in the destination file system;
detecting that one of the plurality of files in the source file system has been modified;
determining whether the modified file is a designated file; and
in response to determining that the modified file is a designated file:
mapping the source file path of the modified file to the corresponding destination file path in a destination file system; and
copying the modified file from the source file path in the source file system to the destination file system, using the destination file path.

9. The computer of claim 8, wherein the computer-readable instructions further cause the computer to perform, in response to determining that a second modified file is an undesignated file:
packaging a second plurality of designated and undesignated files into a package file; and
deploying the package file to the destination file system.

10. The computer of claim 9, wherein monitoring the plurality of files in the source file system further comprises:
receiving a list comprising:
the plurality of source file paths where each respective designated file of the plurality of designated and undesignated files is stored in the source file system; and
a plurality of destination file paths in the destination file system, each destination file path corresponding to a respective source file path;
monitoring the plurality of source file paths contained in the list at pre-determined time intervals; and
if a file path in the source file system is not contained in the list, not monitoring the file path.

11. The computer of claim 10, further comprising:
storing the rule to a memory; and,
wherein mapping the source file path of the modified file to the corresponding destination file path further comprises:
reading the rule from the memory; and
executing the rule.

12. The computer of claim 11, wherein both the source file path and the destination file path are relative file paths.

13. The computer of claim 12, wherein a configuration file specifies whether the modified file is a designated file.

14. The computer of claim 13, wherein the computer-readable instructions further cause the computer to perform:
detecting that a second file of the plurality of files in the source file system has been modified;
determining whether the second modified file is a designated file; and
in response to determining that the second modified file is a designated file:
mapping the source file path of the second modified file to a corresponding destination file path in a second destination file system; and
copying the second modified file from the source file path in the source file system to the destination file path in the second destination file system.

15. A computer program product comprising:
a non-transitory computer-readable storage medium having computer-readable program code embodied therewith, the computer-readable program code comprising:
computer-readable program code configured to monitor a plurality of files in a source file system at pre-determined time intervals,
wherein the plurality of files in the source file system comprises a plurality of designated and undesignated files, the designated files being pre-selected for near-real time editing, and
wherein each of the plurality of files is stored at a respective source file path in the source file system;
computer readable program code configured to search the source file system for a marker file, the marker file identifying the source file path of a first file of the plurality of files to be monitored;
computer-readable program code configured to detect the marker file in the source file system;
computer-readable program code configured to, in response to detecting the marker file, create a rule that if the first file is modified in the source file system, the first file will be copied from the source file path to a corresponding destination file path in the destination file system;
computer-readable program code configured to detect that one of the plurality of files in the source file system has been modified;
computer-readable program code configured to determine whether the modified file is a designated file; and
computer-readable program code configured to, in response to determining that the modified file is a designated file:
map the source file path of the modified file to the corresponding destination file path in a destination file system; and
copy the modified file from the source file path in the source file system to the destination file system, using the destination file path.

16. The computer program product of claim 15, further comprising computer-readable program code configured to, in response to determining that a second modified file is an undesignated file:
packaging a second plurality of designated and undesignated files into a package file; and
deploying the package file to the destination file system.

17. The computer program product of claim 15, wherein monitoring the plurality of files in the source file system further comprises:
receiving a list comprising:
the plurality of source file paths where each respective designated file of the plurality of designated and undesignated files is stored in the source file system; and
a plurality of destination file paths in the destination file system, each destination file path corresponding to a respective source file path;
monitoring the plurality of source file paths contained in the list at pre-determined time intervals; and
if a file path in the source file system is not contained in the list, not monitoring the file path.

18. The computer program product of claim 15, further comprising:
computer-readable program code configured to store the rule to a memory; and, wherein mapping the source file path of the modified file to the corresponding destination file path further comprises:
reading the rule from the memory; and
executing the rule.

19. The computer program product of claim 18, wherein both the source file path and the destination file path are relative file paths.

20. The computer program product of claim 15, wherein a configuration file specifies whether the modified file is a designated file.

* * * * *